United States Patent
Sumner

(10) Patent No.: US 6,606,086 B1
(45) Date of Patent: Aug. 12, 2003

(54) ELECTRONIC GRAPHIC SYSTEM

(75) Inventor: Matthew Sumner, Marlborough (GB)

(73) Assignee: Quantel Limited, Newbury (GB)

( * ) Notice: Subject to any disclaimer, the term of this patent is extended or adjusted under 35 U.S.C. 154(b) by 0 days.

(21) Appl. No.: 08/922,711

(22) Filed: Sep. 3, 1997

(30) Foreign Application Priority Data

Sep. 6, 1996 (GB) .............................................. 9618602

(51) Int. Cl.⁷ ................................................. G09G 5/08
(52) U.S. Cl. .................... 345/173; 345/179; 178/18.01; 178/19.03
(58) Field of Search ................................ 345/173, 179; 178/18.01, 18.06, 19.01, 19.03

(56) References Cited

U.S. PATENT DOCUMENTS

| | | | |
|---|---|---|---|
| 4,514,818 A | | 4/1985 | Walker ......................... 358/183 |
| 4,602,286 A | | 7/1986 | Kellar et al. .................. 364/521 |
| 4,633,416 A | * | 12/1986 | Walker ......................... 364/521 |
| 4,775,858 A | * | 10/1988 | Stapleton et al. ............ 340/724 |
| 4,829,455 A | * | 5/1989 | Long et al. ................... 364/521 |
| 4,931,956 A | * | 6/1990 | Stapleton ..................... 364/521 |
| 5,142,616 A | * | 8/1992 | Kellas et al. ................. 395/135 |
| 5,175,625 A | * | 12/1992 | Miles ........................... 358/183 |
| 5,175,807 A | * | 12/1992 | Cawley et al. ............... 395/128 |
| 5,216,755 A | * | 6/1993 | Walker et al. ............... 395/132 |
| 5,225,817 A | * | 7/1993 | Long ............................ 340/703 |
| 5,276,787 A | * | 1/1994 | Searby ......................... 395/132 |
| 5,347,620 A | * | 9/1994 | Zimmer ....................... 395/129 |
| 5,412,402 A | * | 5/1995 | Searby et al. ................ 345/153 |
| 5,557,713 A | * | 9/1996 | Rae-Smith ................... 395/135 |

FOREIGN PATENT DOCUMENTS

| | | | |
|---|---|---|---|
| GB | 2089625 | 6/1982 | ............ G09G/1/16 |
| GB | 2113950 | 8/1983 | ............ H04N/5/22 |

* cited by examiner

Primary Examiner—Richard Hjerpe
Assistant Examiner—Kimnhung Nguyen
(74) Attorney, Agent, or Firm—Cooper & Dunham LLP

(57) ABSTRACT

An electronic graphic system comprises an image store for storing data defining an image, a stylus and touch tablet device for generating position data representing a sequence of positions including a first position, a brush store for storing data defining a drawing implement, and processor for processing data in the image store. Data is processed by reading patches of initial image data from the store at locations related to the position represented by the position data. An image value is determined as the value of a predetermined pixel in a patch of data at a location corresponding to the first position. Patches of image data are modified with the determined image value depending on the brush data.

13 Claims, 3 Drawing Sheets

ELECTRONIC GRAPHIC SYSTEM

BACKGROUND OF THE DISCLOSURE

1. Field

The invention relates to an electronic graphic system.

2. Description of the Related Art

Electronic graphic or image systems in which the painting or drawing of a colour image can be simulated, or a portion of one image can be merged into another by electronic means are well known. One such graphic system is described in our British patent number 2,089,625 and corresponding U.S. Pat. No. 4,514,818, the teachings of which are incorporated herein by reference. This system includes a user operable input device which may be used by the user to select from a range of colours and a range of intensities and to choose from a set of notional drawing implements for use in the painting or drawing.

When a colour is chosen by the user, values representing the components of the selected colour are stored in a colour register. An implement is chosen by selecting from among different implement representations displayed on a display screen and the selected implement is defined by parameters conforming to a 3-dimensional surface representing the profile of the implement. Generally speaking the implement profile will have a high centre falling away to a lower value toward the periphery of the profile although other profiles may, of course, be defined. The implement profile represents the notional distribution of colour which would be applied by the implement to the image over the area of the image which it covers.

The user operable input device is preferably a touch tablet and stylus combination. The touch tablet is arranged to generate position signals designating the position of the stylus relative to the touch tablet when the stylus is brought into proximity. When the stylus is applied to the touch tablet a pressure signal representing the pressure applied via the stylus to the touch tablet is output from the stylus and stored in a pressure signal register. For some implements, representing say paint brushes, position signals are allowed to be generated for each movement of the stylus by the distance between picture points or similar distance, whilst for other implements, say air brushes, position signals are generated at regular time intervals, even if the stylus is held stationary on the touch tablet.

When a position signal is produced, new video signals (pixels) are derived for every picture point in the patch covered by the selected implement. An image store is provided and each new pixel is written at the appropriate picture point in the store. Such new pixels are derived by a processing circuit in accordance with the selected colour data and the distribution of the selected implement, and in response also to the pressure applied to the stylus and to the value of the pixel previously stored at the respective picture point in the store.

The user, who it is envisaged would normally be an artist lacking experience in the use of computer based systems, paints or draws by choosing a desire colour and implement and then manipulating the stylus, causing the touch tablet to generate a series of position signals which define the path or positioning of the stylus. The processing circuit reads pixels from the image store for a patch of picture points in response to each position signal and these pixels are blended by the processor with signals representing the chosen colour in proportions depending upon the respective values of the brush profile and pressure. The blend is then written back to the picture store replacing the pixels previously stored therein.

In general, the blending process is carried out a number of times for each picture point in the image store whether the implement is moving or stationary (assuming in the case of the moving implement that the patch covered by the implement is larger than the spacing between picture points). The final proportion will depend on the number of processing operations performed per pixel.

To enable the user to observe his creation, the stored picture is read repeatedly and the pixels are applied to a TV-type colour monitor, so that the build-up of the picture can be observed. Of course such systems are not limited to TV-type formats and any suitable video format may be adopted. The system described avoids the problem of jagged edges in the image, an unpleasant stepping appearance normally associated with lines not lying horizontally or vertically in a raster display.

Another system which enables a user to perform picture composition in addition to painting is described in our British Patent No. 2113950 and corresponding U.S. Pat. No. 4,602,286, the teachings of which are also incorporated herein. In this system stores are provided for storing data representing two independent pictures and a control image or stencil. A stencil is produced for example by "drawing" data into the control image store. The stencil data is used to control the combining of the data representing the two independent pictures to produce data representing a composite picture. The data representing the composite picture is output continuously for display of the picture on a monitor. Once the user is satisfied with the displayed composite picture the composite data is stored permanently for subsequent processing or printing for example.

SUMMARY OF THE DISCLOSURE

According to one aspect of the invention there is provided an electronic graphic system comprising: an image store for storing data defining a multiplicity of picture elements that together form an image; user operable means for generating position data representing a sequence of positions including a first position; a brush store for storing data defining a drawing implement as a patch of brush data; and a processor for processing data in the store by reading patches of initial image data from the store at locations related to the position represented by the position data, determining an image value as the value of a predetermined pixel in a patch of data at a location corresponding to the first position, modifying image data in patches read from the store with the determined image value depending on the patch of brush data and writing each patch of modified data back to the store so as to replace the respective patch of initial data previously stored therein.

According to another aspect of the invention there is provided a method of processing image data, the method comprising: storing data defining a multiplicity of picture elements that together form an image; generating position data representing a sequence of positions including a first position; storing data defining a drawing implement as a patch of brush data; and processing data in the store by reading patches of initial image data from the store at locations related to the positions represented by the position data, determining an image value as the value of a predetermined pixel in a patch of data at a location corresponding to the first position, modifying image data in patches from the stored data with determined image value depending on the patch of brush data and writing the patch of modified data back to the stored data so as to replace the patch of previously stored initial data.

The above and further features of the invention are set forth with particularity in the appended claims and together with advantages thereof will become clearer from consideration of the following detailed description of an exemplary embodiment of the invention given with reference to the accompanying drawings.

DETAILED DESCRIPTION

Figure 1:
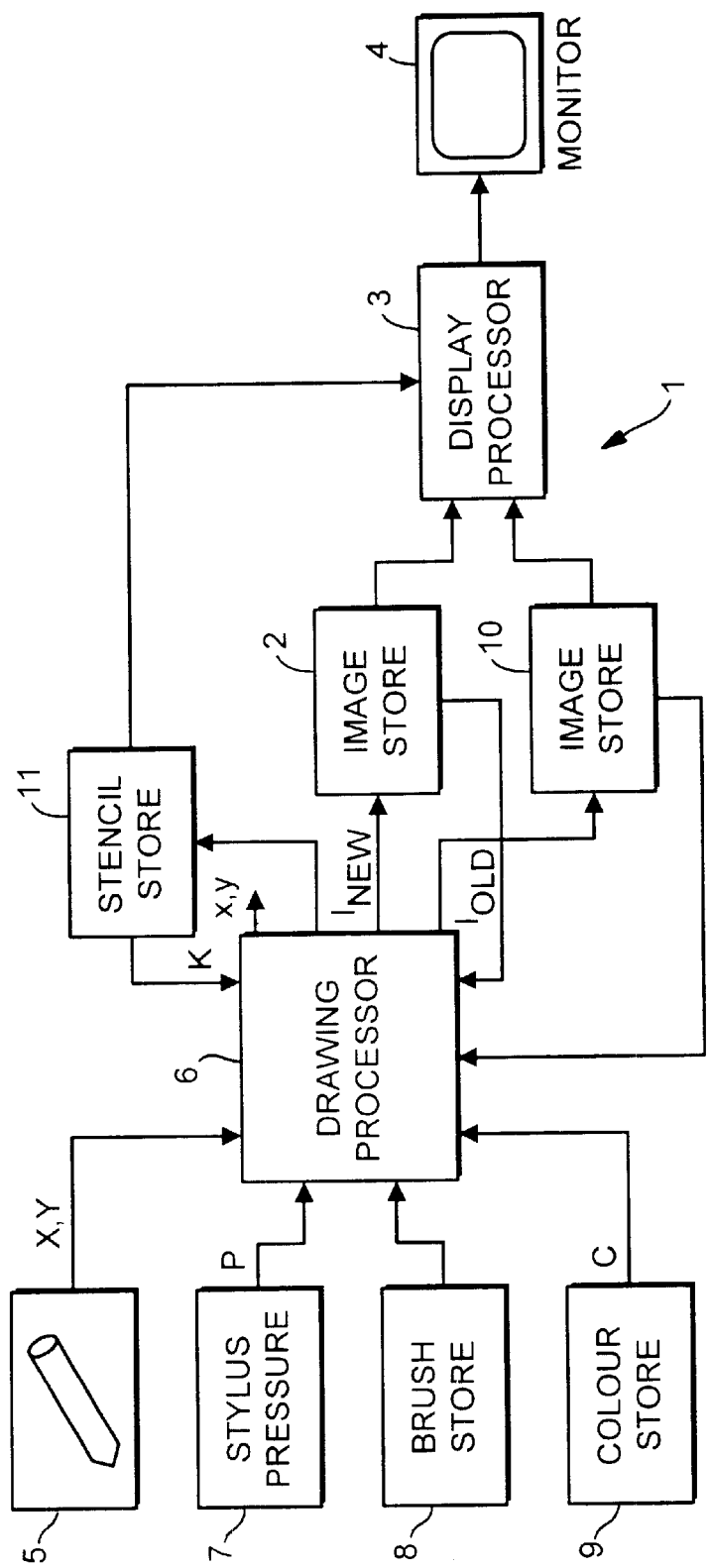
FIG. 1 is a schematic diagram of an electronic graphic system embodying the invention.

Referring now to FIG. 1 of the accompanying drawings, an electronic graphic system, indicated generally at 1, comprises a first image store 2 for storing data defining a first image, a display processor 3 and a monitor 4. The contents of the first image store 2 are read continuously in raster sequence via a serial access port by the display processor 3 and the thus scanned data is output by the display processor 3 for display of the image represented thereby on the monitor 4.

The system 1 also comprises a user operable stylus/touch tablet device 5 by which the user can modify the image data in the store 2, and hence the image represented thereby. As the stylus is drawn across the touch tablet signals representative of the instantaneous position X,Y of the stylus are output to a drawing processor 6. The display processor 3 and the drawing processor 6 are shown as separate entities in order to facilitate understanding by simplifying the following explanation. In practice the two processors 3, 6 may be provided as a single processing unit.

The position information X,Y is provided at a higher resolution than that of the image store 2. That is to say, the spacing between adjacent addresses in the store 2 is significantly larger than the spacing between adjacent positions on the touch tablet 5. It follows that for a given pixel location in the store 2 there are a number of corresponding positions on the touch tablet 5. For example, the spacing between adjacent positions on the touch tablet may be say eight times smaller than that between adjacent addresses in the store 2, and thus there will be sixty four touch tablet positions corresponding to one pixel address in the store. The drawing processor 6 is arranged among other things to convert the instantaneous X,Y position information from the stylus/touch tablet 5 into data representing an equivalent location in the store 2. The equivalent location is defined in terms of a store address and an offset. The offset is calculated as the difference between the store address and the position X,Y of the stylus on the touch tablet. The offset has vertical and horizontal components each having a value of less than one pixel. In the above example the offset would have component values which are integer multiples of ⅛.

As the user moves the stylus on the touch tablet the position data X,Y is continuously generated by the touch tablet 5 and delivered to the drawing processor 6 where it is converted into x,y data identifying patches of store addresses in the store 2. Each patch of addresses is centered over the location in the store equivalent to the corresponding X,Y position data generated by the touch tablet.

The stylus of the stylus/touch tablet device 5 also includes a pressure sensor that outputs a pressure related signal for storage as a parameter in a stylus pressure register 7. Modern stylus touch tablet devices are also capable of generating data defining the orientation (twist) and defining the angle of the stylus in relation to the touch tablet. These parameters may be stored as well as or instead of the pressure data in the stylus register for use by the processor.

Notional drawing implements are predefined in the system 1 and are selectable by the user from a menu of options (not shown) generated by the display processor 3 and displayed on the monitor 4. When the user selects a particular implement, data defining a continuous three dimensional shape covering a patch of pixels and representing the profile of the implement, as described in our above mentioned patents, is stored in a brush store 8.

A selection of predefined colours is also provided in the displayed menu and the user may select one of these predefined colours or instead may define a colour of his own choosing. Data representing the selected colour is stored by the display processor 3 in a colour register 9.

The image store 2 also includes random access ports for random access writing or reading of data to and from the store 2 independently of the serial raster reading of data to the monitor 4. As the stylus is moved across the touch tablet, data at each addressed patch is read from the store 2 via the random access read port to the drawing processor 6. At the same time, brush shape data from the brush store 8 and colour data from the colour store 9 are also input to the drawing processor 6. The reading of the brush patch data from the brush shape store 6 and the colour data from the colour register 8 is synchronised to the generation of individual addresses within the patch of addresses by the drawing processor 6 which outputs said x,y patch addresses to the brush store 8 and reads signals from the colour store 9.

In the drawing processor 6 the image data $I_{OLD}$ read from the image store 2 is processed with the colour data C, the brush data B and the stylus pressure data P to produce new image data $I_{NEW}$ which is written back to the image store 2.

One way in which the drawing processor 6 may process the image data is to interpolate the image data $I_{OLD}$ and colour data C using the product of the pressure data and the brush data as an interpolation co-efficient K to produce new data $I_{NEW}$ in accordance with the algorithm $I_{NEW}=KC+(1-K)I_{OLD}$. This processing serves to add data representing a patch of colour to the image data in the store. In the displayed image the patch appears as if an area of colour has been stamped into the image. The drawing processor 6 is arranged to combine colour data into the image data at regular intervals of time or distance. Thus, as the stylus is moved over the touch tablet data representing a series of overlapping patches of colour ("stamps") is added to the image data in the store and appears in the displayed image as a continuous line or stroke. In the following the read-modify-write operation will be referred to as "painting" or "stamping" as the context requires.

In addition to the above described painting operation, the system 1 is operable to perform image compositing. The system further comprises a second image store 10 for storing data defining a second image, and a stencil store 11 for storing data defining a control image or stencil. Conceptually the image stores 2 and 10 and the stencil store 11 are separate entities, but it will be appreciated that in practice they may be provided in a single large random access store with the capacity to store data relating to at least two colour images and one monochrome control image.

A colour image may be painted into either of the image stores 2, 10 and a monochrome image may be painted into the stencil store 11. Alternatively, image data from another source such as a camera or a scanner may be loaded directly into any or all of the two image stores 2, 10 and the stencil store 11. In the interest of clarity it will be assumed in the following that the image store 2 is used to store data representing a foreground image (F), the image store 10 is used to store data representing a background image (B), and the stencil store is used to store control data (K) defining how the foreground image is to be overlayed on the background image.

The system is arranged to interpolate the foreground image data (F) and the background image data (B) using the control image data (K) as an interpolation coefficient to produce data representing a composite image ($I_C$) in accordance with the compositing algorithm $I_C=KF+(1-K)B$. It will be appreciated that when the stencil data K has a value equal to 0 then the composite image data $I_C$ will be equal to the background image data B. When the stencil data K has a value equal to 1 then the composite image data $I_C$ will be equal to the foreground image data F. For values of K between 0 and 1 the composite image data $I_C$ will contain contributions from both the foreground image data and the background image data.

In one mode of operation the system 1 can be arranged to enable the user to paint the foreground image into the first image store 2. In this first mode of operation as the foreground image data is painted into the image store 2, data representing a corresponding stencil is painted into the stencil store 11. Previously created background image data from an image data source (not shown) is stored in the second image store 10. Data from the two image stores 2, 10 and from the stencil store 11 are read continuously in raster sequence to the display processor 3. The display processor combines the foreground image data from the image store 2 with the background image data from the image store 10 using the control image data from the stencil store 11 in accordance with the above-mentioned compositing algorithm. The composite data is output to the monitor 4 for display of the composite image represented thereby. Thus, as the foreground image and the stencil are painted into the image store 2 and the stencil store 11 respectively, the corresponding change can be seen in the composite image displayed on the monitor 4.

In another mode of operation previously created data representing foreground and background images are written into the image stores 2 and 10 respectively and the drawing processor 6 is arranged to enable the user to paint a control image into the stencil store 11. Again, the two image stores 2, 10 and the stencil store 11 are read in raster sequence to the display processor 3. Thus, the composite image displayed on the monitor 4 changes as the control image is painted to enable the user to see the effect of his painting in combining the foreground image with the background image.

In both of the above-described modes of operation the image data in the two image stores 2, 10 are kept separate. Once the user is satisfied with the displayed composite image, the image data in the two stores is combined by the drawing processor 6 in accordance with the control image data in the store 11. The data is read a pixel at a time from both image stores 2, 10 and the stencil store 11 and combined in accordance with the above-discussed compositing algorithm. The composite data may be written back to one of the stores, say store 10, replacing the data previously stored therein to enable further processing thereof, and/or it may be written to a bulk store (not shown) for more permanent storage.

Figure 2:
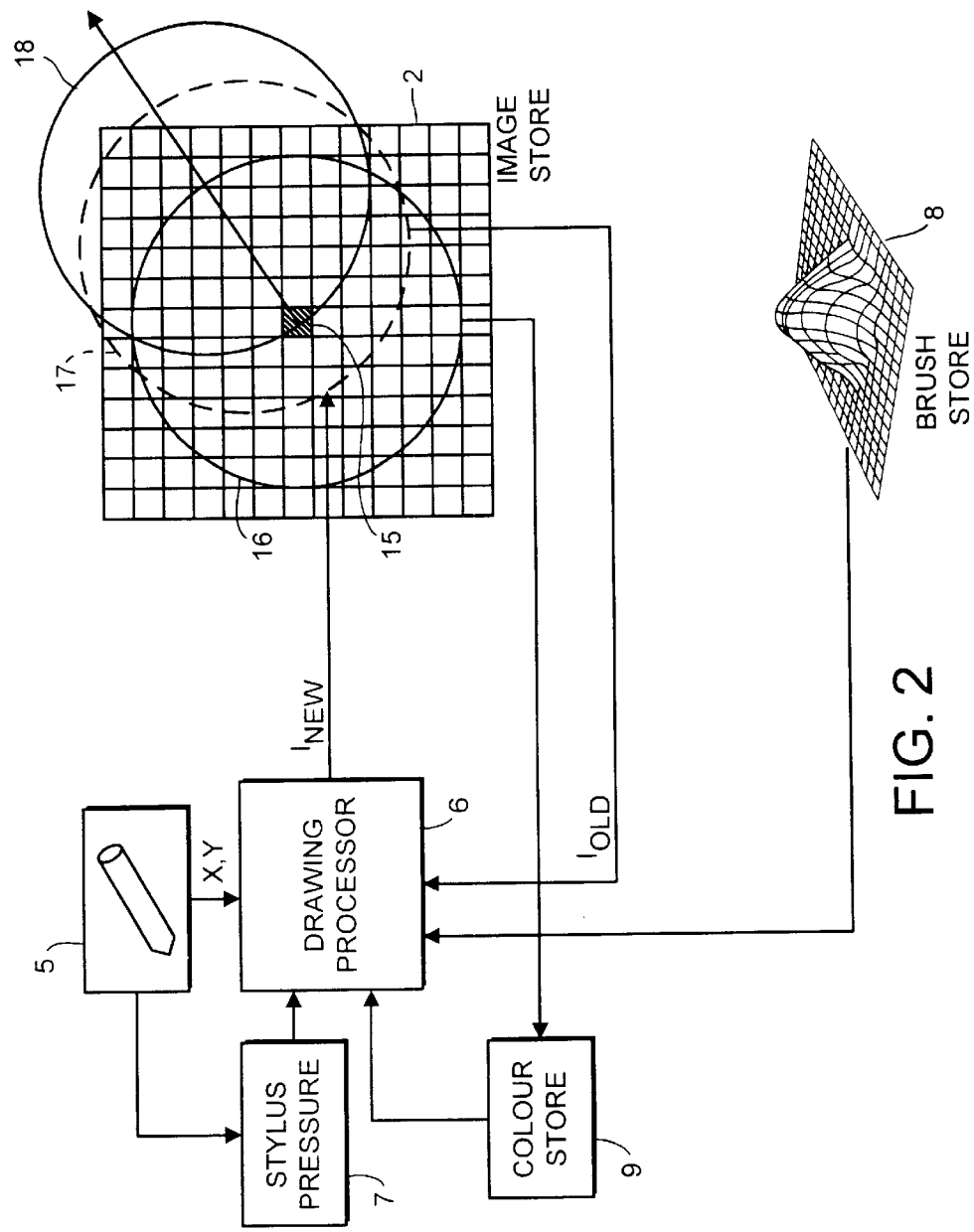
FIG. 2 shows the system of FIG. 1 reconfigured to operate in a colour pick up mode.

The system 1 is also operable in a colour pick-up mode in which a colour is sampled from the image at the start of a stroke and the sampled colour is used as the selected colour that is stamped into the image during subsequent painting. FIG. 2 of the accompanying drawings shows the system 1 configured to operate in this pick-up mode. When the stylus is brought into the proximity of the touch tablet, X,Y coordinate data is generated by the touch tablet and is converted into x,y coordinate data representing the position of a pixel 15 in the image store 2. The pixel 15 is at the centre of an area 16 of pixels that will be altered when colour data is stamped into the store.

The colour value of one of the pixels in the area 16 is stored as colour data in the colour store 9. Conveniently the pixel 15 at the centre of the area is selected, but any other pixel within the area may be selected if so desired. The colour value of the single select pixel is then used as the colour value to be applied to all pixels in subsequent stamps 17, 18.

Alternatively, for a given stamp, e.g. stamp 17, the colour value of the selected pixel may be mixed with the colour value of the selected pixel in the previous stamp, e.g. stamp 16. In this case, the colour value C stored in the colour store is derived in accordance with the mixing algorithm $C=KC_C+(1-K)C_P$, where $C_C$=the colour value of the selected pixel in the current brush stamp 17, $C_P$=the colour value of the selected pixel in the previous brush stamp 16 and K is related to the current pressure data in the stylus pressure register 7. K=0 when zero pressure is applied by the stylus to the touch tablet and K=1 when maximum pressure is applied by the stylus to the touch tablet. Thus, when K=1 (maximum pressure) the colour value stored in the colour store 9 will correspond to that of the selected pixel in the current brush stamp 17, when K=0 (no pressure) the colour value in the colour store 9 corresponds to the colour value of the selected pixel in the previous brush stamp 16, and when K has a value between 0 and 1 (pressure less than maximum) the colour value in the colour store 9 will be a mix of the colour values of the selected pixels in the current brush stamp 17 and the previous brush stamp 16.

Figure 3:
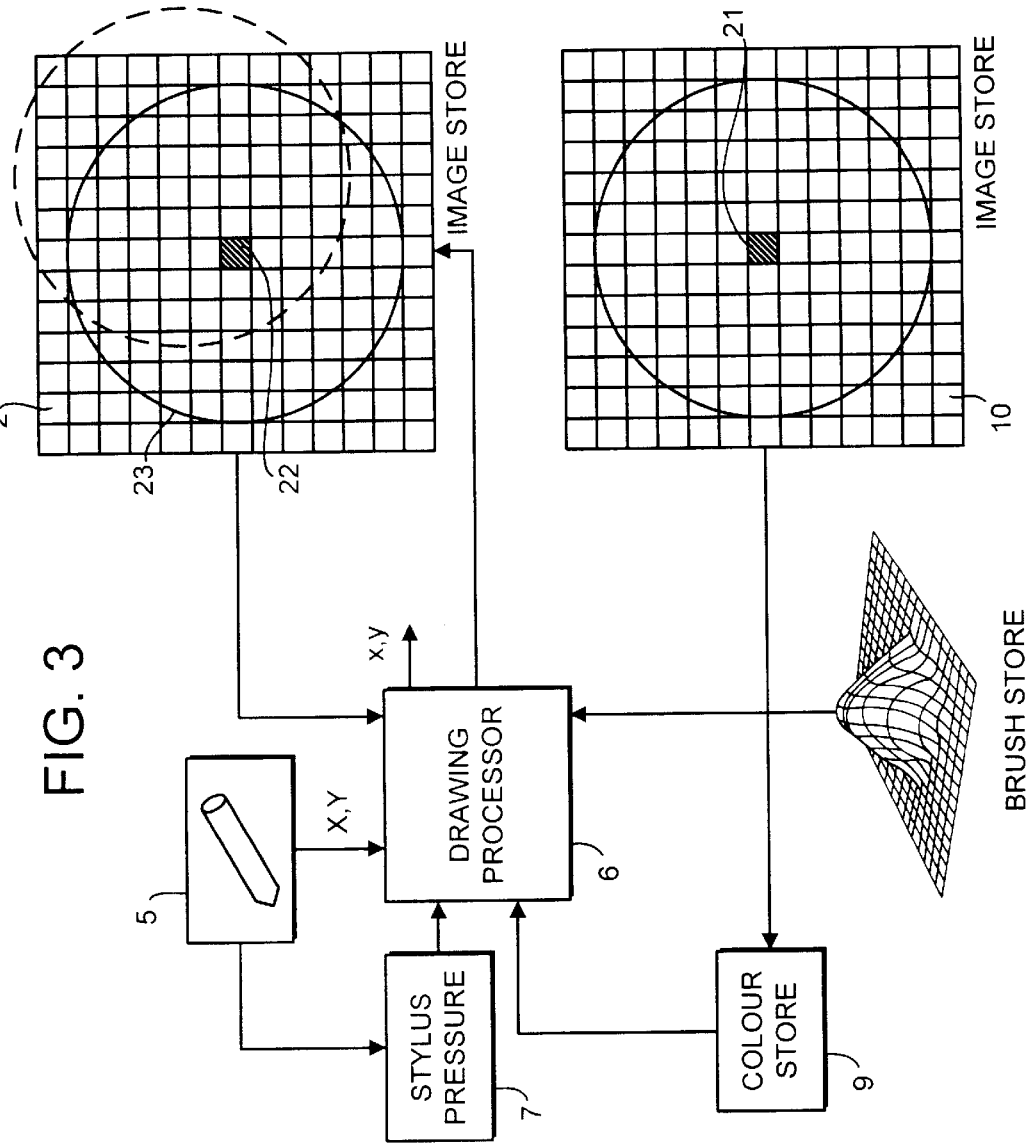
FIG. 3 shows the system of FIG. 1 reconfigured to operate in another colour pick up mode.

A further variation of this pick up mode is shown in FIG. 3 of the accompanying drawings. In this variation the colour value of a pixel 21 in the second image store 10 is selected as the colour value to be stored in the colour store 9. The colour value in the colour store 9 is used as the colour that is stamped into the image data in the first image store 2. Conceptually, the two image stores 2, 10 are identical in size and for each address in one of the stores there is a corresponding address in the other of the stores. The pixel 21 is selected as the pixel at the address in the second image store 10 corresponding to the address of the pixel 22 at the centre of the first brush stamp 23 in the first image store 2. The common address of pixels 21 and 22 is generated as the x,y data by the drawing processor 6 as described hereinabove with reference to FIG. 1. Colour values for consecutive selected pixels from the second image store 10 may be mixed in accordance with the above-described mixing algorithm to derive colour data dependent on stylus pressure. This mode of operation enables the user to create numerous impressionist and/or artistic effects in the image.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

What is claimed is:

1. An electronic graphic system comprising:

an image store for storing data defining a multiplicity of picture elements that together form an image;

user operable means for generating position data representing a sequence of positions including a first position;

a brush store for storing data defining a drawing implement as a patch of brush data; and a processor for processing data in the image store by reading patches of initial image data from the image store at locations related to the position represented by the position data, determining an image value as a value of a predetermined pixel in a patch of data at a location corresponding to the first position, modifying image data in patches read from the image store with the determined image value depending on the patch of brush data and writing each patch of modified data back to the image store so as to replace the respective patch of initial data previously stored therein.

2. A system as claimed in claim 1, wherein the user operable device is operable to generate other parameter data, and wherein the processor is arranged to modify the data in the patches depending on the other parameter data.

3. A system as claimed in claim 2, wherein said user operable means comprises a stylus and touch tablet device.

4. A system as claimed in claim 3, wherein the other parameter data is proportional to pressure applied by the stylus to the touch tablet.

5. A system as claimed in claim 1, wherein the determined image value represents a colour of the predetermined pixel.

6. A system as claimed in claim 1, wherein the predetermined pixel is at a location in the image store corresponding substantially with the first position.

7. A system as claimed in claim 1, further comprising a second image store for storing data defining a multiplicity of picture elements that together form a second image, and wherein the processor is operable to determine the image value as the value of a predetermined pixel in a patch of data at a location in the second image store corresponding to the first position.

8. A method of processing image data, the method comprising:

storing in an image store data defining a multiplicity of picture elements that together form an image;

generating position data representing a sequence of positions including a first position;

storing data defining a drawing implement as a patch of brush data; and processing data in the image store by reading patches of initial image data from the image store at locations related to the positions represented by the input position data, determining an image value as a value of a predetermined pixel in a patch of data at a location corresponding to the first position, modifying image data in patches read from the image store with the determined image value depending on the patch of brush data and writing the patch of modified data back to the image store so as to replace the patch of previously stored initial data.

9. A method as claimed in claim 8, further comprising steps of generating other parameter data, and modifying the data in the patches depending on the other parameter data.

10. A method as claimed in claim 9, wherein the position data and the other data are generated by way of a stylus and touch tablet device and the other parameter data is proportional to pressure applied by the stylus to the touch tablet.

11. A method as claimed in claim 8, wherein the determined image value represents a colour of the predetermined pixel.

12. A method as claimed in claim 8, wherein the predetermined pixel is at a location in the store corresponding substantially with the first position.

13. A method as claimed in claim 8, further comprising steps of storing data defining a multiplicity of picture elements that together form a second image, and determining the image value as the value of a predetermined pixel in a patch of data at a location in the second image corresponding to the first position.

* * * * *